United States Patent [19]
Ashbaugh

[11] 3,797,804
[45] Mar. 19, 1974

[54] ATMOSPHERIC CLOSURE MECHANISM

[75] Inventor: Richard E. Ashbaugh, Albuquerque, N. Mex.

[73] Assignee: The United States of America as represented by the United States Atomic Energy Commission, Washington, D.C.

[22] Filed: Feb. 6, 1973

[21] Appl. No.: 330,153

[52] U.S. Cl. .................... 251/68, 251/73, 251/94, 251/327
[51] Int. Cl. ........................................... F16k 31/44
[58] Field of Search ............... 137/68, 383, DIG. 5; 251/73, 94, 89, 325, 68, 327

[56] References Cited
UNITED STATES PATENTS

| | | | |
|---|---|---|---|
| 2,071,375 | 2/1937 | Allen | 137/DIG. 5 |
| 2,626,633 | 1/1953 | Wilson | 251/73 |
| 2,721,571 | 10/1955 | Gershon | 251/73 |
| 3,090,218 | 5/1963 | Birkness | 137/383 |
| 3,159,378 | 12/1964 | Haag | 251/325 |
| 3,511,183 | 5/1970 | Geffner | 137/68 |
| 3,747,619 | 7/1973 | Wacker et al. | 251/68 |

Primary Examiner—Alan Cohan
Assistant Examiner—George L. Walton
Attorney, Agent, or Firm—John A. Horan; Ignacio Resendez

[57] ABSTRACT

Apparatus for rapidly closing a conduit, using atmospheric pressure for effecting movement of a closure upon release of a retaining pin, the latter being released by electrically activated explosive means, and crushable means for absorbing kinetic energy and thereby stopping the closure.

5 Claims, 5 Drawing Figures

3,797,804

ATMOSPHERIC CLOSURE MECHANISM

BACKGROUND OF INVENTION

This invention relates to a valve closure mechanism which uses atmospheric pressure as the force propelling a closure member.

Various explosively operated devices have been used in those vacuum pipe system applications where it is required to rapidly close a conduit or pipe under vacuum or other reduced pressure environment in order to stop the flow of some fluid through the passageway and the pipe or conduit. In general, closure mechanisms currently available have several disadvantages. For example, closure mechanisms that are available, especially for the size range between two inch diameter to ten inch diameter pipes, generally cannot meet the time requirements to avert destroying the pipe vacuum. Other available mechanisms require high pressure systems or high explosive systems to operate and may be destroyed after each test or operation. Further disadvantages in available closure mechanisms are that they have several moving parts thereby increasing probability of failure, they are quite heavy in the larger sizes, and further, valves of presently available design cannot withstand the speeds required at the ten inch diameter and the like sizes without coming apart or failing.

A typical example of the mechanism which this invention replaces is a ball valve which operates when an explosive drives a piston through a wall thereby releasing high pressure gas from a bottle. The highly pressurized gas, such as at 1,500 psi, then rotates a valve which closes a port. The above described mechanisms are relatively expensive to manufacture and, in most instances, may not be reused without extensive reworking. An additional disadvantage where pressurized systems are used is the problem of maintaining a leak free container. This requires constant checking of the pressurized system to insure valve operation when required. Since this invention uses atmospheric pressure to propel the closure member, this disadvantage is eliminated.

SUMMARY OF INVENTION

In view of the above, it is an object of this invention to provide a novel, fast closure apparatus which uses atmospheric pressure to activate or propel the closure member.

It is a further object of this invention to reduce probability of failure of closure mechanism by minimizing the number of moving components, eliminating need for highly pressurized gas, and reducing the amount of explosive charge required for activation of the novel atmospheric closure mechanisms of this invention.

It is a further object of this invention to provide a novel atmospheric closure mechanism which may be used for a wide range of pipe diameters and which is relatively economical to manufacture.

It is a further object of this invention to provide a closure apparatus which can close a 10 inch diameter pipe within 35–40 milliseconds.

It is a further object of this invention to provide an atmospheric fast closure apparatus which may be reused after minimal amount of reworking.

Various other objects and advantages will appear from the following description of the invention, and the most novel features will be particularly pointed out hereinafter in connection with the appended claims. It will be understood that various changes in the details, materials, layout and arrangement of the parts, which are herein described and illustrated in order to explain the nature of the invention, may be made by those skilled in the art without departing from the scope of this invention.

The invention comprises a housing having an evacuated or reduced pressure environment passageway therethrough, a closure member, normally held from movement by retaining means, for closing this passageway wherein the closure member is subjected to atmospheric pressure at one portion and to the reduced or evacuated pressure environment at another portion facing the passageway, means for releasing a retaining pin means from the closure member, impact absorbing cushion means for preventing rebound of said atmospherically activated or propelled closure member, and sealing means suitably disposed to prevent passage of solids or fluids out of or through the closed passageway.

DETAILED DESCRIPTION

Figure 1:
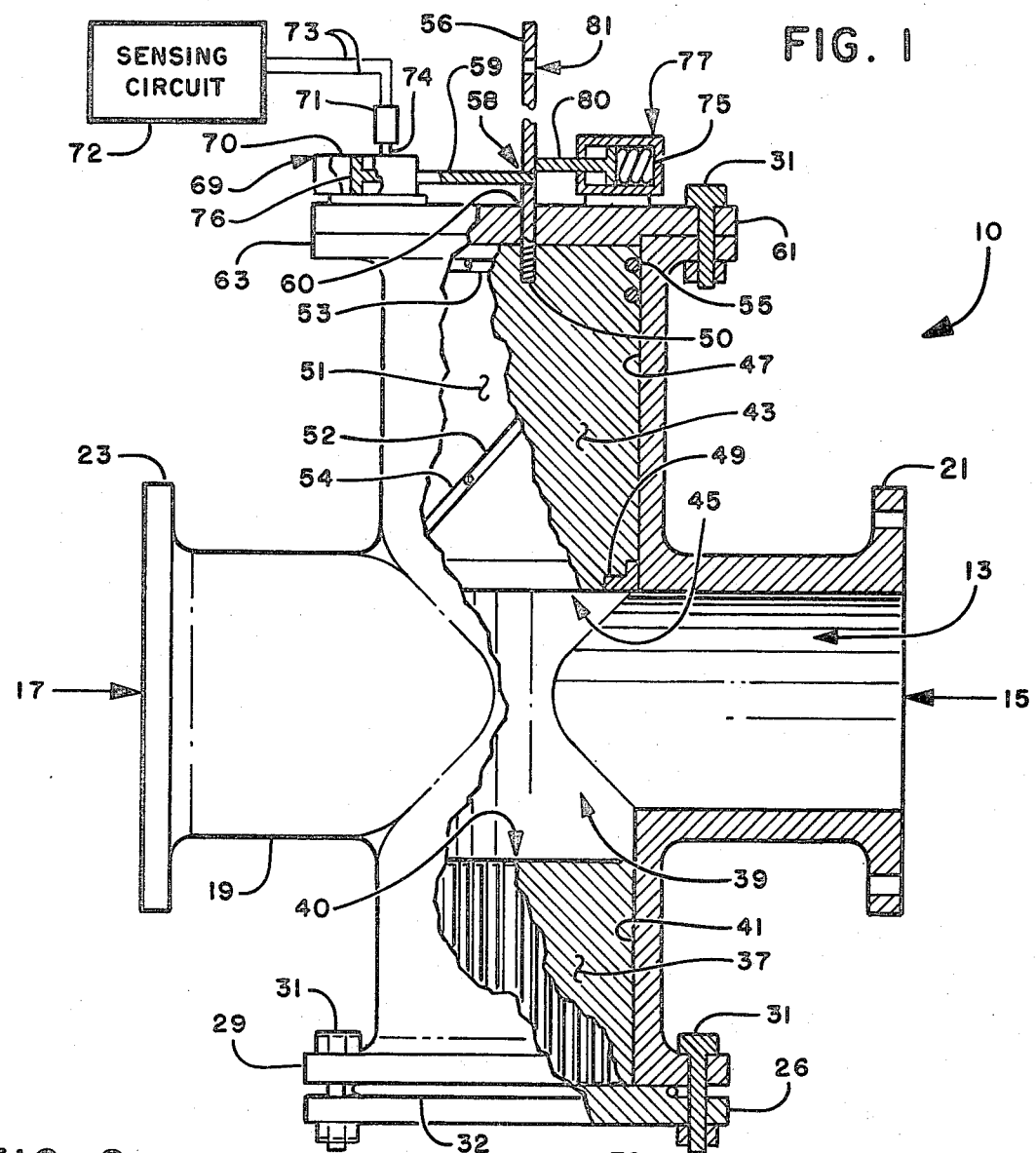
FIG. 1 illustrates in partial cross section an embodiment of this invention.

As shown in FIG. 1, the atmospheric fast closure mechanism or valve 10 may comprise a multichamber unit having an opening or passageway 13 for fluid passage therethrough extending such as between ports 15 and 17 and intersected by a closure passageway 39 which houses the closure members. One of ports 15, 17 may be an inlet port and the other an outlet port. The valve housing 19 may be constructed of any suitable material such as steel or aluminum or other metal having appropriate strength characteristics and also compatible with the process fluids. Gaskets, O-rings and the like may be made from neoprene or other synthetic rubber, tetrafluoroethylene, or the like materials. Further, valve housing 19 may be, if required, cadmium or the like material plated or otherwise treated for corrosion protection. Suitable lightweight valve housings have been made using 6061-T6 aluminum alloy.

Flanges 21 and 23, as shown, may be appropriately connected or fastened into conduits or pipelines (not shown) of appropriate diameter as passageway 13 through any suitable threaded bolts, fasteners, or the like means such as those employed to fasten cover-plate or cap 26 to flange 29. This uses a suitable arrangement of nuts and threaded bolts 31 and may, if desired, employ suitable resilient sealing means or gaskets such as O-ring 32 which may be disposed between cover plate 26 and flange 29 to insure a leak proof or hermetic connection. Cover plate 26 closes closure passageway 39.

An impact absorbing material such as a honeycomb cushion 37 made from a suitable material, such as 3003 aluminum alloy having a compressive strength of about 95 pounds per square inch (psi), is shown suitably disposed within closure passageway 39 in the area of closure impact with the cushion means 37, hereinafter generally referred to as impact chamber 40 generally surrounded by wall 41. Impact chamber 40 may be at least partially disposed on the side opposite piston chamber 45. It may be desirable to retain the cushion means in location using a suitable adhesive. The compressive strength of the honeycomb cushion or impact absorbing material 37 is such that it will linearly absorb the kinetic energy of closure member or piston 43 thereby smoothly stopping the piston 43 and preventing rebound of the piston. The type of material used and the crush resistance or compressive strength required will be dependent upon piston size, closure member weight, rebound that may be tolerated, etc. In general, a compressive strength greater than about 100 psi may prevent complete closure and cause closure member rebound while a material with compressive strength of less than 90 psi may not suitably impede movement of the closure member. The compressive strength requirement of the FIG. 4 embodiment honeycomb is not as critical as the FIG. 1 embodiment since the FIG. 4 honeycomb acts primarily to stop the closure member. The seal is effected by the O-rings on the sheath. The honeycomb of the FIG. 1 embodiment must stop the closure member within a particular narrow range to effect sealing.

Figure 2:
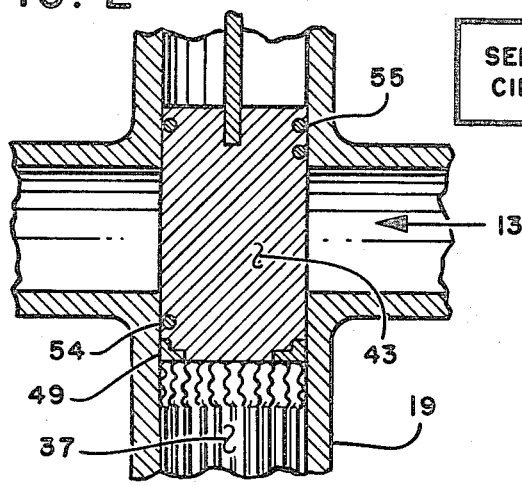
FIG. 2 illustrates in a fragmentary view, in cross section, the position of the piston or closure member of FIG. 1 after actuation.

Prior to activation of the closure mechanism system, piston or closure member 43 is disposed laterally to partially evacuated passageway 13 and removed from passageway 13 within closure passageway 39 in an area referred to hereinafter as piston chamber 45 generally opposite impact chamber 40 and defined by generally annular wall 47. The portion of piston or closure member 43 which traverses passageway 13 after activation is sufficiently large so as to effectively close off passageway 13. Closure means 43 has a first portion exposed to the ambient atmospheric pressure, such as through port 66 shown in FIG. 3, and a second portion sealed from said first portion and facing a partially evacuated or reduced pressure environment in opening or passageway 13. Piston 43 may have at a front or lower portion thereof as shown in FIG. 1, a bearing ring 49 useful for guiding the movement of the piston or closure member 43 down the closure passageway 39 so as to prevent misalignment and subsequent possible closure failure. Bearing ring 49, which may be made of tetrafluoroethylene or other material, may be suitably attached such as through screw type connections onto piston 43 or may be threaded and screwed directly or otherwise attached thereto. Piston or closure member 43 may also have disposed as part of the surface or wall 51 of piston 43, a groove 52 of suitable configuration such as shown in FIG. 1, in which is disposed suitable gasket or sealing means such as O-ring 54. O-ring 54 may be transversely and circumferentially extending within groove 52 from a lower portion to an upper portion of closure member 43 so as to be in contact with valve housing 19 after activation of said closure system as shown in FIG. 2. This disposition of said sealing means 54 provides a gas leak-proof or hermetic closure of passageway 13. Further disposed on an upper portion adjacent the top portion of piston 43 is a circumferentially extending gasket or sealing means such as O-ring 55 suitably disposed in retaining groove 53 which, as shown in FIG. 2, effectively seals off the upper portion of valve 10 such that passage of gas or debris may be impeded or prevented.

Piston or closure member 43 may have attached thereto a piston shaft 56 through any suitable means such as by welding or by a mechanical screwed connection 50 as shown in FIG. 1, or the like. If desired, piston 43 may be hollow and cylindrical or tubular with a cover-plate thereon to which the piston shaft is suitably attached covering the piston. Piston shaft 56 may have a suitable notch, slot, recess or port 58 or other means for receiving retention means such as a retainer pin 59.

Figure 3:
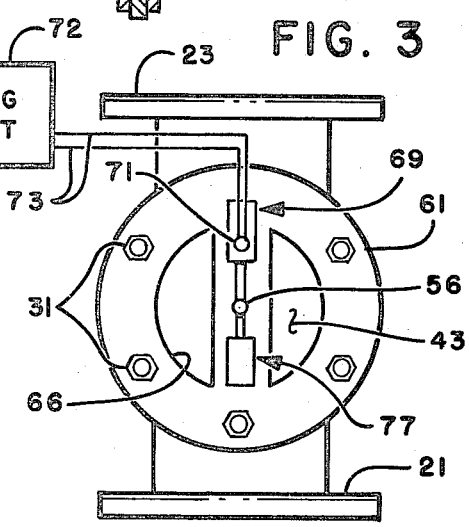
FIG. 3 illustrates a top plan view of the embodiment of FIG. 1.

Piston shaft 56 extends through generally centrally disposed piston shaft port 60 located on mounting plate or cap 61 which may be suitably attached to a flange 63 or other integral part of housing 19 by threaded bolts and nuts or other fasteners 31. As shown in FIG. 3, mounting plate 61 may have therein one or more ports, holes, or openings 66 which, at an appropriate time, effect movement of, or propel, piston 43 due to the pressure on the portion of piston 43 exposed to atmospheric pressure through ports 66 and reduced pressure on portion of piston 43 facing passageway 39, which may be at a partially evacuated pressure. Also mounted on mounting plate 61 through suitable means is explosive actuated latch pin assembly 69, which may have thereon an explosive or squib 71 in electrical connection through electric conductor 73 or the like with an electronic sensing circuit 72 connecting to a suitable power source (not shown) for activation of the explosive actuated latch pin assembly 69.

A typical illustration of operation of explosively actuated latch pin assembly 69 is as follows. Upon reception of an appropriate signal from the electronic sensing circuit 72, by means of electrical conductors 73 or the like, the explosive or squib 71 is detonated such that the gaseous products of the explosion pass through conduit 74 and enter the retainer pin housing 70 forcing a shaft plate 76, which may be part of retainer pin 59 or which may be mechanically or otherwise joined with retainer pin 59, away from piston shaft 56. This results in release of piston shaft 56 and piston 43 movement, propelled or activated through atmospheric pressure, in a direction towards impact absorbing means 37. The use of this explosively actuated retaining pin removal means provides the fast action required for this type of valve. A typical example of a commercially available squib suitable for these purposes is manufactured by Conax Corp. at 16024 Ventura Blvd., Suite 216, Encino, Calif., 91316.

It should be understood that various changes in the structure, method of activating the latch pin assembly, method of providing leak proof seals, etc., and the like are within the skill of the art and said changes do not bring the altered apparatus out of the scope of this invention. Thus while projections or retaining pin 59 and latching pin 80 are shown as entering ports or recesses on piston shaft, it will be clear that the shaft could carry the projections and recesses could be appropriately positioned such as to release the shaft projections when required.

The atmospheric closure apparatus or valve of this invention may be placed into a vacuum system using a suitable mechanical or otherwise connection with flanges 21 and 23 as described above such that a leak proof connection is effected through means well known in the art. Operation of the closure involves activation of the firing circuit to explode the latch pin assembly thereby pulling retaining pin from piston shaft 56 and releasing piston shaft 56. Since the pipe system and therefore the valve 10 are under vacuum, i.e., at a pressure of about 1,000 Torr or less, and preferably at about $10^{-3}$ Torr pressure or less, to achieve maximum closing speed, atmospheric pressure on the outside causes the piston to move from its open position to its closed position where it impacts with the impact absorbing means. The strength, thickness, and material of impact absorbing means have been calculated to stop the piston in such fashion so that complete closure of the passageway is effected.

Atmospheric pressure acts through ports 66 on piston 43 as shown in FIG. 3. Thus these closures could be used essentially at any location and orientation wherein closure of a vacuum system is required.

Once the piston 43 impacts the cushion 37, which serves the purpose of effecting gradual slowdown of the piston and effects closure of passageway 13, movement of piston 43 in an upward direction or in a return direction is prevented by means of latching mechanism 77 which contains a latching pin 80 riding upon piston shaft 56 under a compressive force by means of compressed spring 75. When the piston or closure means 43 has impacted, latching pin 80 enters latching port 81 on piston shaft 56. This prevents movement of piston 43 should there be a back pressure through closed passageway 13.

Figure 4:
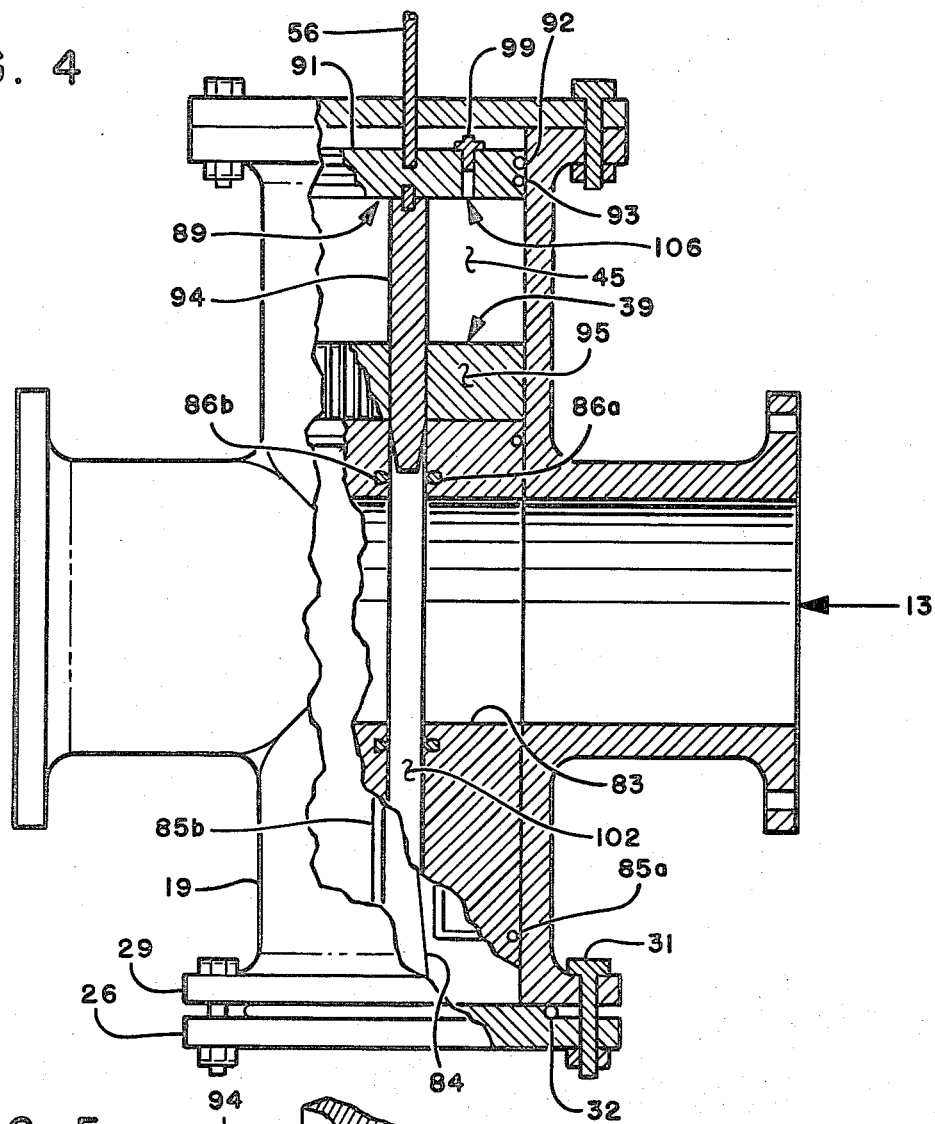
FIG. 4 illustrates in partial cross section an alternate embodiment of this invention.

FIG. 4 illustrates an alternate embodiment that may be preferred for larger diameter atmospheric valve closures. The valve housing, passageway, etc., are as brought out in FIG. 1. The closure mechanism is different in that a sleeve, plug, or sheath 83 or closure member receiving means having passageways therethrough corresponding to passageway 13 is placed within valve housing 19 prior to installation of the closure member or means 89. Closure member 89 comprises a piston head 91 having suitable gasket or sealing means such as one or more O-rings 92, 93 thereon, which provide a seal between the valve and the atmosphere, a piston of suitable configuration such as a flat blade piston 94 suitably attached to the piston head 91 by means such as an adhesive, welding, or screwing into a tapped bore, and the like, and a nipple 99 which includes well known check valved passageway therethrough (not shown) which may be used as will be described hereinafter. Closure means receiving member or sheath 83 may be made in two sections and joined at junction line 84 for ease of manufacture, and has therein a plurality of gaskets or sealing means such as O-rings 85a, 85b, 86a, 86b, which, after activation and closure, effectively seal both sides of passageway 13 so as to prevent, retard or impede gas or debris movement or passage between both sides of passageway 13 which closure means 89 blocks. O-rings 86a and 86b may be of the wedge or captivated type-O rings in order to prevent movement of said rings as through friction as blade member or closure means 94 moves downward and contacts these O-rings. O-rings 86a and 86b effect a seal between piston blade 94 and receiving means or sheath 83. O-rings 85a and 85b effect a seal between passageway 13 and piston chamber 47 so as to prevent, impede or retard movement or passage of debris or gas through same. It should be noted that reference throughout this application to "O-rings" is to be taken in the generic sense, that is a continuous annular ring, and not in the strict sense wherein an "O" must be formed by the ring.

Upon activation of closure means 89 in the manner described above for the embodiment shown in FIG. 1, the flat blade or the like piston 94, guided by the passageway or opening 102 in closure receiving means or sheath 83, moves into the closed position. The piston head 91 impacts with impact cushion 95 which may be of any suitable material (such as recited for cushion means 37) such as aluminum alloy 3003 which has a compressive strength of 95 lbs. per square inch. Closure is thereby effected rapidly without objectionable bounce back or rebound of closure means 89.

The nipple 99 in piston head 91 is connected by means of a passageway 106 through piston head 91 and enables one to attach a suitable air or gas source so that, after activation and closure, a suitable fluid may be fed in through nipple 99 and thereby pressurize piston chamber 45 to effect movement of closure means 89 to a location about or similar to the initial position. This is not essential but may be included as a feature for facilitating reuse of this invention.

These closure embodiments enable closure of a vacuum pipe system for pipe sizes of generally any size range but preferably from about two inches up to and including ten inches without destruction of the pipe closure, or pipe vacuum. Further, the apparatus may be reused simply by opening the ends of closure member passageway 39, adjusting the closure member to the starting or initial position, and replacing the crushable material and squib.

This invention may be used in alternate modes, that is, as a debris closure whereby the use of those O-rings not sealing the exterior atmosphere from the interior atmosphere are not used and as a gas and debris closure whereby these sealing means or O-rings are used. As shown, however, the atmospheric valve closures act both as debris and gas closure since the position of the O-rings prevent passage of gas and small particles from one side of the closing member to the other side within passageway 13.

Valve closures made as described have effectively sealed various diameters within a very short time. For example, when the internal pressure is at about $10^{-3}$ Torr or less and an atmospheric pressure of about 11.6 pounds per square inch (psi), 2 inch diameter passageways have been closed within 20 to 22 milliseconds, 6 inch diameter passageways have been closed within about 26 milliseconds, and 10 inch diameter closures have been closed within about 35 to 40 milliseconds. Although both embodiments of FIG. 1 and FIG. 4 may be used as desired, the embodiment of FIG. 1 may be preferred for the closures used for sealing the smaller diameter passageways and the embodiment of FIG. 4 may be used for sealing passageways having a diameter of 6 inches or above. The embodiment of FIG. 4 has an advantage over that of FIG. 1 in that the position of closure of the closure means is not as critical since the sealing means (e.g., O-rings) is disposed on the piston receiving member or sheath rather than on the closure member itself.

Figure 5:
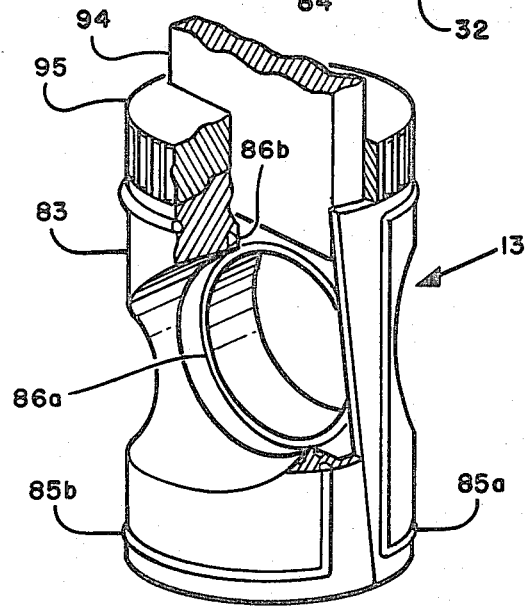
FIG. 5 is a perspective, partially cutaway view of a portion of the closure member assembly of FIG. 4.

It should be understood that the embodiment of FIG. 4, also includes suitable shaft release and locking means such as explosive actuated latch pin assembly 69, and latching means 77 similar to those used in the embodiment of FIG. 1. FIG. 5 illustrates in perspective and in partial cross section the sheath assembly of the embodiment of FIG. 4.

What is claimed is:

1. An atmospheric pressure actuable valve closure apparatus for closing a partially evacuated conduit, comprising a housing having a fluid passageway therethrough including inlet and outlet ports and a closure passageway angularly intersecting said fluid passageway including an open ended closure member chamber at one side of said fluid passageway and an impact chamber at least partially disposed at the other side of said fluid passageway; flange means adjacent said inlet and outlet ports for mating with a said conduit; an impact absorbing cushion in said impact chamber; a closure member in said closure member chamber movable toward said cushion to a closed position blocking said fluid passageway; a mounting plate secured to said housing extending across the open end of said closure member chamber having apertures therethrough for communicating ambient pressure to said closure member chamber; a shaft secured to said closure member extending through one of said apertures; a retaining pin adjacent said shaft for normally retaining said shaft and closure member in an initial open position; electrically actuable, explosive means for moving said retaining pin to release said shaft; latch means adjacent said shaft for locking said shaft and closure member in a closed position responsive to movement of said closure member to said closed position; and sealing means for impeding fluid passage between said partially evacuated conduit and said closure member chamber.

2. The apparatus of claim 1 wherein said closure member is of generally cylindrical configuration having a first circumferentially extending retaining groove adjacent one end thereof and a second transversely and circumferentially extending retaining groove disposed from adjacent one end to the other thereof, and said sealing means comprises resilient O-rings within said grooves.

3. The apparatus of claim 1 wherein said closure member comprises a flat blade closure member connected to a generally cylindrical piston head, and further containing a sheath within said impact chamber having openings corresponding with said housing fluid passageway and having a sheath passageway for receiving said flat blade closure member, and said cushion is disposed on sheath.

4. The apparatus of claim 3 including means for supplying a fluid into said sheath passageway for removing said closure member from said closure member passageway.

5. The apparatus of claim 1 wherein said cushion comprises aluminum alloy honeycomb material.

* * * * *